Aug. 24, 1926.
J. E. ALBINSON
1,596,863
EXTENSION PIPE JOINT
Filed Sept. 18, 1925
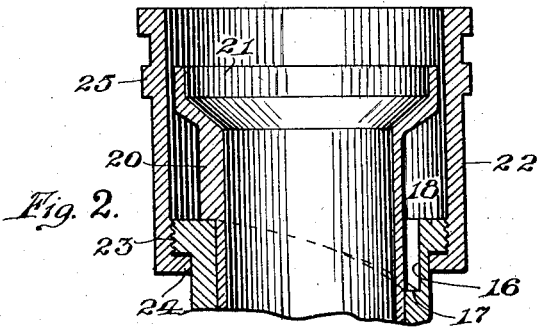
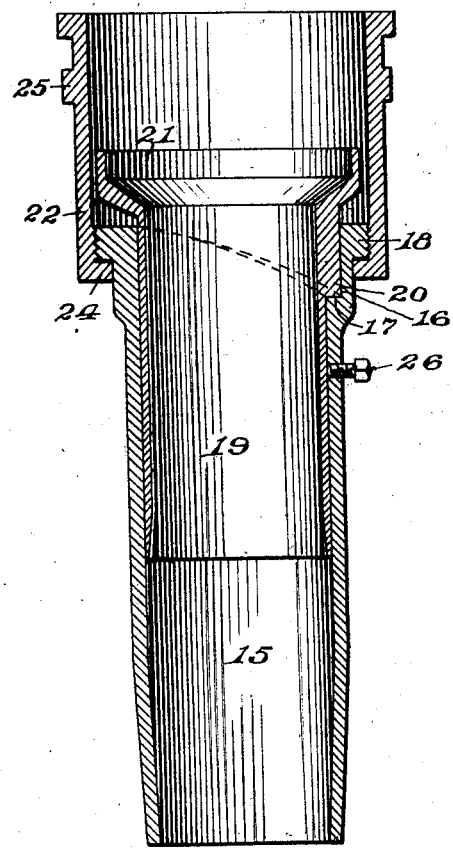
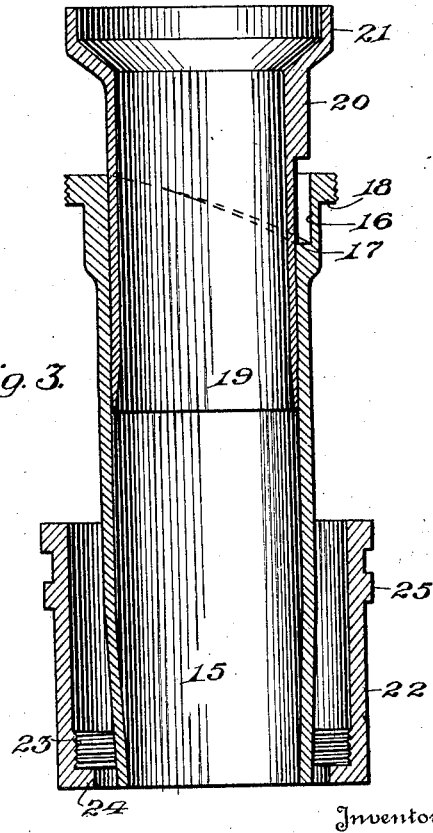
Inventor
James E. Albinson,
By J. Stuart Freeman.
Attorney Patented Aug. 24, 1926.

1,596,863

UNITED STATES PATENT OFFICE.

JAMES E. ALBINSON, OF WASHINGTON, DISTRICT OF COLUMBIA.

EXTENSION PIPE JOINT.

Application filed September 18, 1925. Serial No. 57,136.

The object of the invention is to provide improvements in longitudinally expansible insertable pipe joints to connect pipe sections fixed with respect to each other.

Another object is to provide in such a joint, a first section adapted to receive a second section and having a radially extending peripheral flange provided with a threaded surface, and a hub or sleeve correspondingly threaded and when united to said flange being adapted to receive suitable packing material therein and surrounding said second section.

And a still further object is to provide a form of joint, wherein a cam-surface is formed upon the inside of the upper portion of a given pipe section, and a second section is slidable within said first section, and is provided with a projecting lug normally riding upon said cam-surface, relative rotation of said sections operating to vary their combined overall length.

With these and other objects in view, the present invention comprises further details of construction and operation, as fully brought out in the following specification, when read in conjunction with the accompanying drawings, in which Fig. 1 is a vertical diametrical section of one form of the invention, showing the pipe sections in their closest relationship; Fig. 2 is a fragmentary portion of a similar section, showing the sections in more extended relationship; and Fig. 3 shows the pipe sections and packing-containing sleeve of Figs. 1 and 2 in partially separated positions.

Referring to Figs. 1 to 3, inclusive, the lower pipe section 15 is provided in the upper portion of its inner surface with a spiral inwardly extending recess 16, having a cam-surface 17, said upper portion of this first section being provided with a peripheral, radially extending flange 18, externally threaded, for a purpose hereinafter described.

In this form of pipe joint, a second section of pipe 19 is adapted to be normally positioned within said first section, but comprises an enlarged bell-end 21 adapted to receive a superimposed piece of pipe (not shown). The outer surface of said second section is provided with lugs 20, extending downwardly from the bell 21, and normally resting upon some part of the cam-surface 17, the upper projecting portion of the lug 20 (see Fig. 2) being serviceable as a means for turning said second section with respect to said first section, to vary the overall length of the joint as a unit.

A sleeve 22 is provided inwardly with threads at 23 which normally engage the threads upon the flange 18, the lower end of said sleeve being provided with a radially inwardly extending flange 24, to limit its upward movement, while suitable packing may be inserted within said sleeve around said second section, rotation of said sleeve being readily accomplished by means of lugs 25 carried thereby. Also, after the joint has been assembled between two relatively fixed pipes, and the sleeve has been positioned as desired, the two sections are prevented from relative rotation by means of one or more suitably positioned set screws or bolts 26. The packing referred to may be fibrous, such as oakum, and should be tamped within the sleeve, after which lead is poured in upon the oakum or the like.

While only a straight joint has been illustrated, it is to be understood that the invention may be equally applied to all of the familiar joints used in plumbing, such as Y's and T's, and particularly the T-Y's.

Furthermore, the adjustable repair joint of the present invention has the advantageous feature, that the new section of pipe, that is the joint as a unit, which is to fill the space that was previously occupied by a removed section, will itself support that part of the discontinuous line of pipe that constitutes the hanging or pendant end portion.

Having thus described my invention, what I claim and desire to protect by Letters Patent of the United States is:—

1. A pipe-joint, comprising a pipe section provided with a recess opening without effective obstruction in one axial direction throughout its circumferential extent and limited in the opposite direction by a cam surface, and a second section insertable axially into said first section and having a projection engaging said cam surface, whereby rotation of said second with respect to said first sections varies the overall length of said joint, and said second section and its projection being axially removable from said first section and its recess respectively without relative rotation.

2. A pipe-joint, comprising a pipe section, provided with a recess in its inner surface, said recess being defined by a cylindrical side wall and in one axial direction by a cam surface, and in the other axial direction being open without effective obstruction throughout its angular extent, said pipe section also having a radially projecting externally threaded flange, a second pipe-section normally extending into said recess and cooperating with said cam-surface, whereby rotation of said second with respect to said first sections varies the overall length of the joint, said sections being separable axially, and said projection being disengageable from the cam-surface of said recess without relative rotation, and a sleeve which, when in threaded engagement with said flange, operates to retain packing about the relatively movable parts of the joint, said sleeve being provided with an inwardly directed flange adapted to cooperate with said first flange, to limit the movement of said sleeve upon said first section in one direction.

In testimony whereof I have affixed my signature.

JAMES E. ALBINSON.